Patented Feb. 27, 1923.

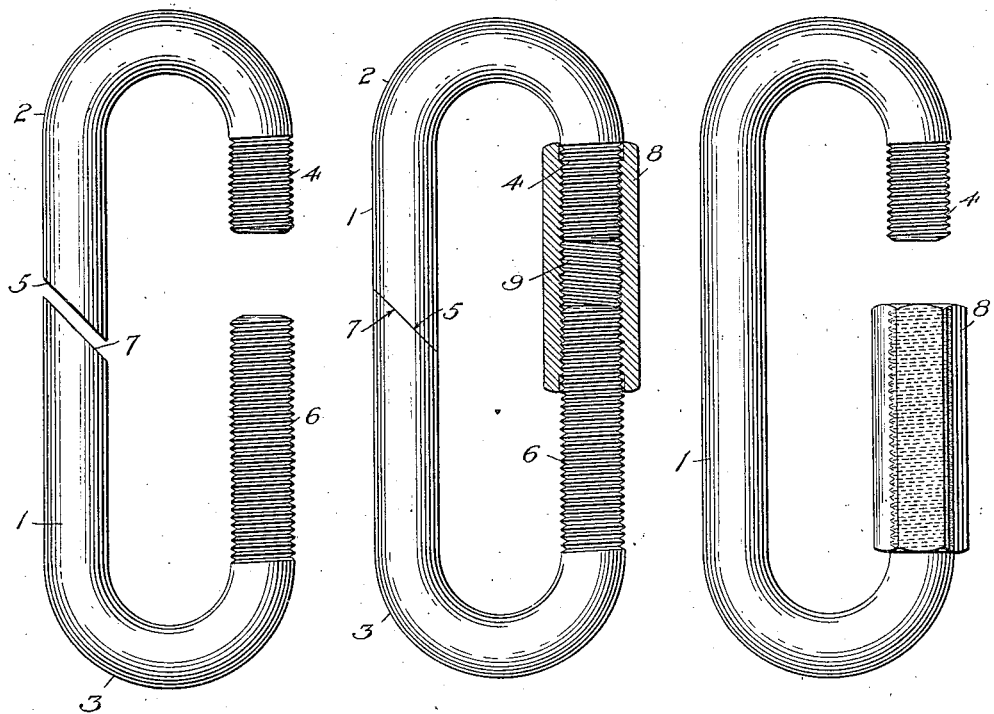

1,447,064

UNITED STATES PATENT OFFICE.

BENJAMIN COUSINS, OF SLICK, OKLAHOMA.

METHOD OF PRODUCING DETACHABLE CONNECTING LINKS.

Application filed October 4, 1921. Serial No. 505,395.

*To all whom it may concern:*

Be it known that I, BENJAMIN COUSINS, a citizen of the United States, residing at Slick, in the county of Creek and State of Oklahoma, have invented certain new and useful Improvements in Methods of Producing Detachable Connecting Links; and I do hereby declare the following to be a full, clear, and exact description of the invention, such as will enable others skilled in the art to which it appertains to make and use the same.

My invention relates to a method of producing a detachable connecting link which is designed to be especially suitable for use as a part of the pumping equipment for connecting a group of oil or other wells to a single pumping power. As is well known, the links in general use for detachably connecting a pumping power to the pumps of the several wells are commonly of a simple C-form; and although they are made of heavy stock the severe pulls they are required to withstand in service frequently cause them to open or spread so as to render them ineffective and useless.

It has been heretofore recognized that the C-link would be greatly improved if the end portions thereof which are spaced apart to form the slot could be coupled together when the link is performing its duty; but so far as I am aware no economically practicable method has ever been evolved for the production of such an improved C-link. By my method it is practically possible to produce a detachable connecting C-link in which the axially alined spaced portions of the body member thereof are adapted to be connected by a threaded adjustable sleeve which serves to prevent the spreading of the link.

In the drawings chosen for the purpose of explaining the nature of the invention,—

Figure 1 is an elevational view of portions of the body member of the link prior to their union.

Figure 2 is a view, partly in elevation and partly in section, showing the relation of the parts prior to the welding of the segments of the body member.

Figure 3 is a view in elevation of the completed link, the adjustable sleeve being shown in open position.

The body portion 1 of the link is produced from a plurality of pieces 2 and 3, respectively, of weldable material which may be iron bar stock of round cross section. One end of the member 2 is threaded, as at 4, and its other end is preferably scarfed as at 5. The other part 3 of the body member of the link is provided at one end with threads 6 and at its other end is scarfed, as at 7, to correspond to the scarfed end 5. The threaded portion 6 is preferably of an extent equal to the length of the internally threaded sleeve 8 which cooperates with the threads 4 and 6.

The bending of the pieces 2 and 3 into the form of segments of the link body is conveniently effected after said body portions have been threaded and scarfed. The sleeve 8 having been formed upon its interior with threads 9, corresponding to those of the body portions 2 and 3 of the link, is then screwed upon the threaded part 6 of the link segment 3 and the other link segment is thereafter positioned so that its threaded end 4 is properly spaced from and in axial alinement with the threaded end portion 6. The adjustable sleeve 8 is then rotated sufficiently to cause its threads to engage the threads 4 upon the link segment 2 the segments 2 and 3 thereby being maintained in proper spaced relation by means of said sleeve as shown in Fig. 2. As this operation is performed before the scarfed ends 5 and 7 of the segments of the link body 1 are welded together, the parts are readily capable of the necessary manipulation or adjustment to enable the sleeve 8 simultaneously to have threaded engagement with the threaded ends 4 and 6 of both segments of the link. While the threaded ends 4 and 6 are thus connected in spaced relation by the sleeve 8, the scarfed ends 5 and 7 of the segments of the link body 1 are welded together, thus completing the link.

It will be perceived that my method of manufacturing a link by forming the link body in separate segments and establishing the threaded relation of the adjustable sleeve to the threaded portions of the link body prior to the union of its segments, makes it feasible to provide the body member of the link with a threaded adjustable sleeve adapted to conect the axially alined spaced ends of the link body.

I claim:—

1. The method of producing a detachable connecting link involving a body member having axially alined spaced threaded portions and a threaded adjustable sleeve adapted to connect said threaded portions, said method comprising the following steps, namely; threading one end of each of a plurality of pieces of weldable metal adapted to constitute portions of the body member of the link; forming a sleeve member with threads adapted to cooperate with the threads of said body portions; connecting the threaded ends of said body portions in spaced relation by means of said sleeve; and uniting the said body portions by welding while they are connected by said sleeve.

2. The method of producing a detachable connecting link involving a body member having axially alined spaced threaded portions and a threaded adjustable sleeve adapted to connect said threaded portions, said method comprising the following steps, namely: threading one end and scarfing the other end of each of a plurality of pieces of weldable metal adapted to constitute portions of the body member of the link; forming a sleeve member with threads adapted to cooperate with the threads of said body portions; connecting the threaded ends of said body portions in spaced relation by means of said sleeve; and welding together the scarfed ends of said body portions while the threaded ends thereof are connected by said sleeve.

3. The method of producing a detachable connecting link involving a body member having axially alined spaced threaded portions and a threaded adjustable sleeve adapted to connect said threaded portions, said method comprising the following steps, namely: threading one end of each of a plurality of pieces of weldable metal adapted to constitute portions of the body member of the link; forming a sleeve member with threads adapted to cooperate with the threads of said body portions; screwing said sleeve upon the threaded end of one of said body portions; positioning the other body portion with its threaded end spaced from and in axial alinement with the threaded end of the body portion on which said sleeve is screwed; rotating said sleeve sufficiently to cause it simultaneously to have threaded engagement with the threaded ends of said body portions while they are in spaced relation and axial alinement; and uniting the threaded body portions by welding while they are connected by said sleeve.

4. The method of producing a detachable connecting link involving a body member having axially alined spaced threaded portions and a threaded adjustable sleeve adapted to connect said threaded portions, said method comprising the following steps, namely: threading one end and scarfing the other end of each of a plurality of pieces of weldable metal adapted to constitute portions of the body member of the link; bending each of said pieces into the form of a segment of the body member; forming a sleeve member with threads adapted to cooperate with the threads of said body portions; connecting the threaded ends of said body portions in spaced relation by means of said sleeve; and welding together the scarfed ends of said body portions while the threaded ends thereof are connected to said sleeve.

5. The method of producing a detachable connecting link having axially alined spaced threaded portions and a threaded adjustable sleeve adapted to connect said threaded portions, said method involving threading a portion of each of a plurality of members adapted to constitute segments of the body member of the link, connecting said threaded portions of said segments by a threaded sleeve, and thereafter connecting said segments in fixed relation while said sleeve is in threaded engagement therewith.

In testimony whereof I affix my signature.

BENJAMIN COUSINS.